United States Patent Office.

GARRETT VAN WAGENEN, OF RACINE, WISCONSIN.

Letters Patent No. 81,711, dated September 1, 1868.

IMPROVED MEDICAL COMPOUND FOR TREATING HORSES, CATTLE, &c.

*The Schedule referred to in these Letters Patent and making part of the same.*

TO ALL WHOM IT MAY CONCERN:

Be it known that I, GARRETT VAN WAGENEN, of Racine, in the county of Racine, and State of Wisconsin, having invented certain new and useful Chemical Compounds, which act as remedial and disinfecting-agents in diseases of horses, cattle, sheep, &c.; and I do hereby declare that the following is a full and complete description of the ingredients, and manner of compounding the same:

Strait's oil, one gallon.
South Carolina pine tar, two-thirds of a gallon.
Barbadoes tar, one-quarter of a gallon.
Red lead, three pounds.
Hæmetoxyline, two pounds.
Bees-wax, three pounds.
Chloride of zinc, one ounce.

First put the bees-wax in a kettle, and let it melt, then add the pine and Barbadoes tar, then the Strait's oil.

Put the hæmetoxyline in a separate kettle, cover it with water, then put it over a slow fire until it is well dissolved.

Put enough oil out of the said gallon to mix with the lead, until it is about the consistency of common paint.

Put the chloride of zinc in a glass vessel, adding water enough to dissolve it.

After the wax and tar have been boiled together, over a slow fire, for ten minutes, remove them from the fire, and add the hæmetoxyline, then stir in the red lead, next the chloride of zinc, and stir the whole mass until it is cold, when it is ready for use, forming a salve.

It proves an efficient remedy for diseases of horses, cattle, and sheep suffering from foot-diseases in all their various forms, and also for old, morbid sores, contractions of feet, fistula, galls, &c., requiring disinfecting-tonics and stimulants, while it removes the morbid condition, and restores a healthy granulation.

What I claim as my invention, and desire to secure by Letters Patent, is—

The remedial compound, composed of the above-mentioned ingredients, and prepared in the manner described.

G. VAN WAGENEN.

Witnesses:
   W. H. BURRIDGE,
   J. H. BURRIDGE.